(12) United States Patent
Tandon et al.

(10) Patent No.: US 7,163,594 B1
(45) Date of Patent: Jan. 16, 2007

(54) HIGH TENSILE STRENGTH GRAY IRON ALLOY

(75) Inventors: Laxmi C. Tandon, Rockford, IL (US);
Reginal A. Pete, Caledonia, IL (US);
Omar J. Fakhoury, Rockford, IL (US)

(73) Assignee: Gunite Corporation, Rockford, IL (US)

( * ) Notice: Subject to any disclaimer, the term of this patent is extended or adjusted under 35 U.S.C. 154(b) by 16 days.

(21) Appl. No.: 10/685,097

(22) Filed: Oct. 10, 2003

(51) Int. Cl.
*C22C 37/00* (2006.01)

(52) U.S. Cl. ............................ 148/321; 420/26; 420/27

(58) Field of Classification Search ................ 148/321; 420/26, 27
See application file for complete search history.

(56) References Cited

U.S. PATENT DOCUMENTS

| | | | | |
|---|---|---|---|---|
| 4,948,437 A | * | 8/1990 | Metzler | 148/612 |
| 5,032,194 A | * | 7/1991 | Metzler | 148/321 |
| 5,894,010 A | * | 4/1999 | Porkert et al. | 420/15 |
| 5,948,353 A | * | 9/1999 | Lawrence et al. | 420/15 |
| 5,980,651 A | * | 11/1999 | de Azevedo et al. | 148/321 |
| 6,161,661 A | * | 12/2000 | Pahle et al. | 188/218 XL |

\* cited by examiner

*Primary Examiner*—George Wyszomierski
(74) *Attorney, Agent, or Firm*—Michael Best & Friedrich LLP

(57) ABSTRACT

A gray iron alloy having a composition comprising about 4.10% to about 4.25% carbon equivalent, about 3.5% to about 3.65% carbon, about 0.4% to about 0.9% manganese, about 1.5% to about 1.9% silicon, less than about 0.12% phosphorous, less than about 0.17% sulfur, about 0.6% to about 0.8% molybdenum and about 0.3% to about 0.6% copper, and where said carbon is predominantly present as free carbon having a Type A flake graphite microstructure. The alloy is particularly useful in the manufacture of brake drums and other articles requiring a combination of high tensile strength and good thermal conductivity.

37 Claims, 1 Drawing Sheet

HIGH TENSILE STRENGTH GRAY IRON ALLOY

FIELD OF THE INVENTION

The present invention relates to cast iron alloys and especially to high tensile strength cast iron alloys suitable for use in vehicle brake components, such as brake drums and brake rotors.

BACKGROUND OF THE INVENTION

Gray iron is an alloy of iron, carbon and silicon, which typically contains small amounts of other elements and residual impurities, such as manganese, phosphorous and sulfur. The carbon in gray iron is predominantly present as free carbon in the form of Type A flake graphite, which is characterized by long, thin flakes of graphite that are randomly oriented and dispersed throughout the iron matrix. In general, the graphite content of gray iron is a function of the carbon equivalent (C.E.), which may be calculated in percentage by weight as:

$$C.E. = (\% \text{ Carbon}) + \frac{1}{3}(\% \text{ Silicon} + \% \text{ Phosphorous})$$

The presence of Type A flake graphite provides gray iron with excellent thermal conductivity. In addition, gray iron is relatively inexpensive to produce and has good castability and machineability. Gray iron also has good vibrational damping capacity. Thus, gray iron has a number of mechanical and physical properties which make it suitable for use in a variety of applications. For example, gray iron is particularly useful in the manufacture of automotive components such as brake drums and brake rotors, which require materials having good thermal conductivity to resist thermal fatigue caused by heating during braking.

One drawback to gray iron is that it has relatively low tensile strength and, therefore, articles made of gray iron typically have larger and heavier structures than would be necessary if the same component could be made of other materials. The need for lighter weight gray iron products is particularly acute in the trucking industry, which is subject to state and municipal codes limiting the weight of commercial vehicles. For example a 20% reduction in the weight of a gray iron brake drum can result in an overall weight saving of as much as three hundred pounds for a tractor-trailer having multiple axles.

Various grades of gray iron exist that have increased tensile strength, which would permit lightweight product designs. However, grades of gray iron having higher tensile properties also have a lower carbon equivalent and, therefore, reduced graphite content. The carbon equivalent of such high tensile strength gray irons is typically below the range of about 4.10% to about 4.25% which must be maintained for good thermal conductivity and thermal shock resistance. For example, pursuant to ASTM specifications (American Society of Testing Materials), gray irons of Class 40, 45, 50, 55 and 60 having tensile strengths of 40,000 psi and greater all have a maximum carbon equivalent of 3.80%. In addition, the decrease in graphite content also reduces the castability, machineability, and vibrational damping capacity of gray iron. Thus, increasing the tensile strength of gray iron sacrifices its desirable mechanical and physical properties.

Various attempts have been made to increase the tensile strength of gray iron by the addition of other elements, to permit the design of lightweight cast iron products such as brake drums. Ductile iron is formed by the addition of approximately 0.02% to 0.04% magnesium (by weight) to cast iron, which causes the graphite to assume a spheroidal or nodular form. The change from flake to nodular graphite increases the tensile strength of ductile iron to >65,000 psi in comparison to gray iron that is typically used for brake drum applications, which has a tensile strength of only about 30,000 psi. However, the presence of nodular graphite significantly decreases thermal conductivity of ductile iron in comparison to gray iron containing Type A flake graphite.

In the case of brake drums, reduced thermal conductivity also reduces the ability of the brake drum to absorb and then dissipate the heat generated during braking. Repeated and/or prolonged braking creates thermal stress, which can cause the braking surface to deform and form ridges that extend parallel to the central axis of the brake drum. As braking continues, these ridges create hot spots where the thermal stress exceeds the tensile strength of the material and causes fractures. When the brake drum cools, these fractures widen and become visible as hairline cracks, often referred to as "heat checks." Heat checks are frequently formed and then worn away as part of the normal braking process. However, in some cases heat check fractures may continue to grow and eventually pass through the wall of the brake drum, causing drum failure.

Gray iron possesses good thermal conductivity and, therefore, resists development of heat checks. In addition, heat checks grow relatively slowly in gray iron and, therefore, are more likely to be worn away before they have an opportunity to progress significantly. In contrast, ductile iron's poor thermal conductivity makes it impractical as a material for brake drums due to its susceptibility to thermal stress and failure caused by heat check cracks, despite the fact that ductile iron has a much higher tensile strength than gray iron.

High tensile strength compacted graphite iron alloys have been developed that have physical characteristics intermediate between gray iron and ductile iron, as disclosed in U.S. Pat. Nos. 6,572,172 and 5,858,127. Compacted graphite has a shape intermediate between flake and nodular graphite, which provides increased tensile strength in comparison to gray iron and improves thermal conductivity relative to ductile iron. Nonetheless, compacted graphite iron brake drums remain much more susceptible to failure caused by thermal stress cracks than gray iron brake drums. Increasing the carbon equivalent in such alloys improves thermal conductivity, but reduces tensile strength. In addition, these compacted graphite irons are harder to produce with consistency, in addition to posing various process constraints.

Other attempts to improve tensile strength while retaining good thermal conductivity include composite products of steel and gray iron, such as brake drums commercially available as SteelLite (ArvinMeritor, Inc.—Troy, Mich.) and CentriFuse Lite (Hayes Lemmerz Int'l, Inc.—Northville, Minn.). Such brake drums have an outer steel shell supporting a gray iron inner liner, that provides a braking surface with good thermal conductivity. Although such composite brake drums provide good resistance to heat checking, they are not as durable as conventional gray iron or compacted graphite iron brake drums, in part due to the problem of separation at the interface between the gray iron liner and steel shell. In addition, the process of forming the gray iron liner within the steel shell requires centrifugal casting equipment and other tooling. Accordingly, composite steel/gray iron brake drums can be more expensive to produce than conventional gray iron brake drums.

Thus, it is desirable to provide a gray iron alloy having increased tensile strength, without sacrificing the mechanical and physical properties of gray iron, such as good thermal conductivity and machineability. In addition, if such an improved gray iron alloy could be found which also provided improved vehicle deceleration when incorporated into brake drums, a particularly significant invention would be had.

SUMMARY OF THE INVENTION

These needs and other needs are satisfied by the present invention, which comprises a gray iron alloy, containing in percentage by weight:
- about 4.10% to about 4.25% carbon equivalent
- about 3.5% to about 3.65% carbon;
- about 0.4 to about 0.9% manganese;
- about 1.5% to about 1.9% silicon;
- less than about 0.12% phosphorous;
- less than about 0.17% sulfur;
- about 0.6% to about 0.8% molybdenum; and
- about 0.3% to about 0.6% copper;

with the balance being essentially all iron except for incidental elements and impurities commonly found in cast iron, and where carbon equivalent (C. E.) is calculated as:

$$C.E. = (\% \text{ Carbon}) + \tfrac{1}{3}(\% \text{ Silicon} + \% \text{ Phosphorous}).$$

The carbon in the inventive gray iron alloy is predominantly present as free carbon in the form of Type A flake graphite. In one preferred embodiment of the invention, the gray iron alloy contains chromium in an amount less than about 0.2% by weight. In yet another preferred embodiment of the invention, the gray iron alloy contains magnesium in an amount less than about 0.005% by weight.

DETAILED DESCRIPTION OF THE INVENTION

Figure 1:
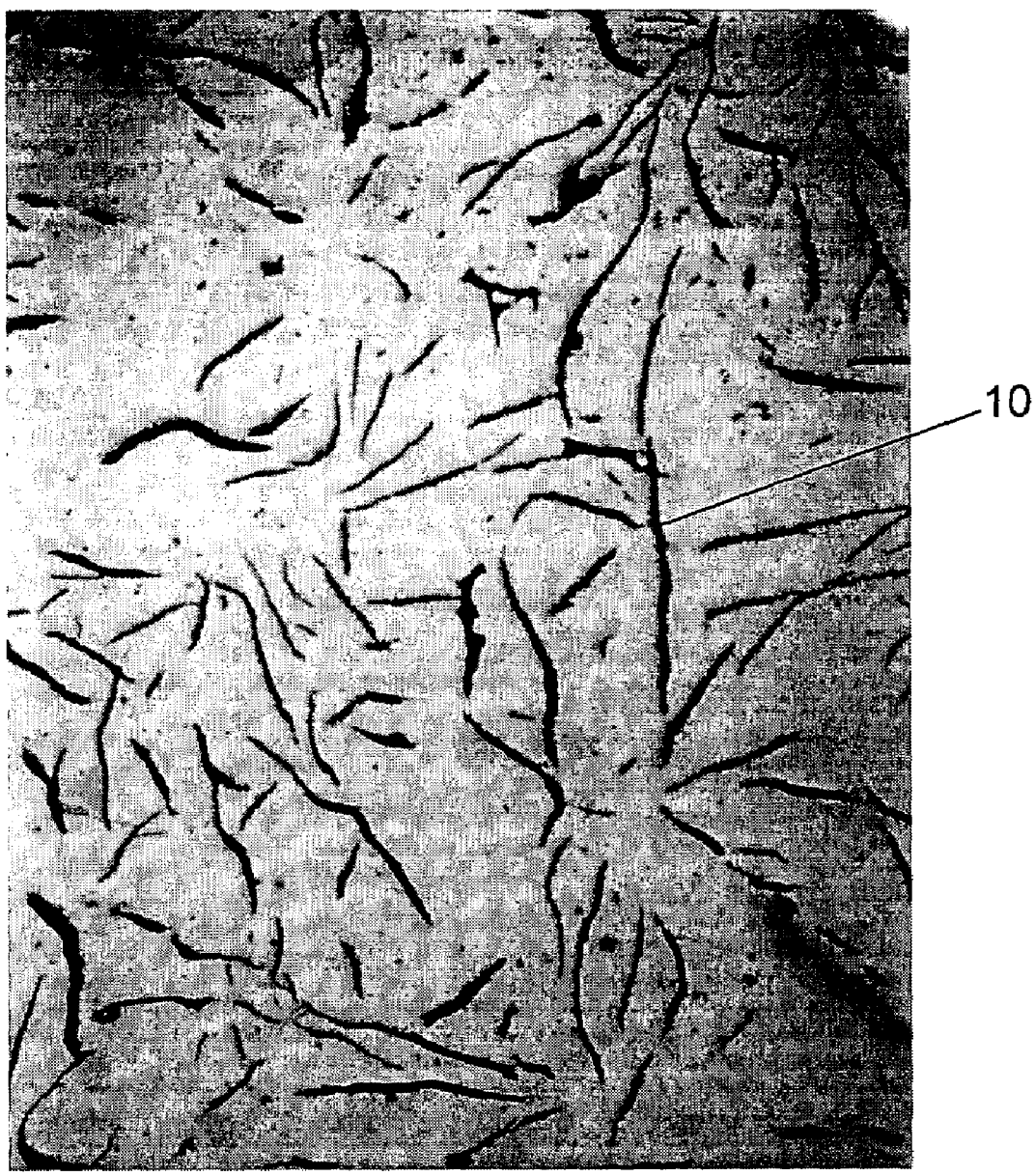
FIG. 1 is a photomicrograph at 100× magnification of the inventive gray iron alloy containing molybdenum and copper, showing the presence of Type A graphite flakes.

In accordance with the present invention, a gray iron alloy containing carefully controlled levels of both molybdenum and copper is described which provides distinct advantages when compared to the prior art. Although it is known in the art to increase the tensile strength of gray iron by the addition of molybdenum and/or copper, such alloys typically have reduced thermal conductivity and machineability in comparison to conventional gray iron, as well as other characteristics which limit their suitability for many applications. In particular, the presence of molybdenum has a number of undesirable effects on the physical and mechanical properties of gray iron. For example, molybdenum reduces the carbon volume fraction of gray iron and has a refining effect on the maximum length of graphite flakes, which reduces the thermal conductivity of the resulting gray iron alloy. In addition, molybdenum promotes the formation of carbide, which increases the hardness and, thereby, reduces the machineability of the resulting gray iron alloy. Gray iron alloys containing molybdenum typically have increased carbon equivalent to compensate for molybdenum's refining effect on graphite. However, increasing the carbon equivalent also decreases the tensile strength of the alloy, making it an unsatisfactory solution.

In contrast to prior art gray iron alloys, it has been determined that the combination of molybdenum and copper in controlled amounts can increase the tensile strength of gray iron while maintaining the Type A flake graphite microstructure, thermal conductivity and machineability of conventional gray iron, without the need to increase the carbon equivalent. In addition, the inventive gray iron alloy unexpectedly provides an increased rate of deceleration when incorporated into vehicle brake drums.

The gray iron alloy of the present invention is produced in a standard furnace using conventional methods. The molten iron is inoculated with molybdenum as ferromolybdenum of ladle size addition and copper as copper chops into the pouring ladle. Other forms of molybdenum and copper may be used, as will be appreciated by those of skill in the art. The iron is then stirred with compressed air through a steel pipe to ensure a homogenous mixture of alloys in the iron. The final composition of the gray iron upon casting is set forth below, expressed as percentage of total weight:
- about 4.10% to about 4.25% carbon equivalent;
- about 3.5% to about 3.65% carbon;
- about 0.4% to about 0.9% manganese;
- about 1.5% to about 1.9% silicon;
- less than about 0.12% phosphorous;
- less than about 0.17% sulfur;
- about 0.6% to about 0.8% molybdenum; and
- about 0.3% to about 0.6% copper.

Carbon equivalent (C.E.) was calculated by the formula:

$$C.E. = (\% \text{ Carbon}) + \tfrac{1}{3}(\% \text{ Silicon} + \% \text{ Phosphorous}).$$

Other elements and contaminants commonly found in cast iron were present in residual amounts—e.g., less than about 0.2%—as is well known in the art.

The combination of copper and molybdenum in the relative amounts set forth above is found to have a cooperative effect in increasing the tensile strength of the inventive gray iron alloy and a complementary effect in maintaining a graphite content similar to that of conventional gray iron. The amount of molybdenum present in the gray iron alloy is preferably controlled to within a range of about 0.6% to about 0.8% by weight, and is most preferably present in an amount of about 0.70%+/−0.10% by weight. Increasing the amount of molybdenum in excess of the preferred range provides diminishing benefit with respect to the tensile properties of gray iron, while increasing molybdenum's undesirable effects. Thus, the presence of molybdenum in an amount ranging from about 0.6% to about 0.8% has been found to provide the maximum practical effect in increasing the tensile strength of gray iron, while limiting molybdenum's undesirable effects. In addition, the presence of molybdenum is believed to enhance the high temperature strength and corrosion resistance of the inventive gray iron alloy.

The presence of copper is also known to increase the tensile strength of gray iron in amounts of up to about 0.3% by weight, but produces very little effect at higher concentrations. However, copper also has a graphitizing effect, which enhances the flake graphite microstructure of gray iron. Thus, the addition of copper in an amount ranging from about 0.3% to about 0.6%, and most preferably in an amount of 0.40%+/−0.10-%, has been found to provide the maximum increase in tensile strength, and also compensate for the negative effect of molybdenum on carbon volume fraction and graphite flake length.

The amount of carbon in the inventive alloy is balanced against the amount of silicon to achieve about 4.10% to about 4.25% carbon equivalent, which is necessary to maintain good thermal conductivity, as described above. It is preferred that carbon be present in about 3.5% to about 3.65%, and most preferably about 3.60%+/−0.05. The carbon in conventional gray iron is predominantly free carbon, as will be understood by those of skill in the art. The percentage of free carbon in the inventive gray iron alloy is expected to be somewhat less than that of conventional gray iron, due the addition of molybdenum which promotes the formation of carbides and marginally reduces carbon volume. Nonetheless, it is believed that the inventive gray iron alloy contains more than about 99% free carbon, similar to conventional gray iron.

Silicon has a graphitizing effect that contributes to the carbon equivalent of gray iron. Thus, the amount of silicon present in the inventive gray iron alloy may be slightly reduced in comparison to the silicon content of conventional gray iron or otherwise controlled to ensure that the graphite content of the alloy does not compromise its tensile strength. It is presently preferred to have silicon be present in an amount ranging from about 1.5% to about 1.9%, and most preferably in an amount of 1.75%+/−0.15%. The molten iron is inoculated with calcium bearing ferrosilicon in the ladle or prior to pouring into the mold, to provide nuclei for precipitation of flake graphite.

Other elements in the inventive gray iron alloy are present in amounts similar to conventional gray iron compositions, as are well known in the art. Sulfur and phosphorous are typically present in gray iron in residual amounts—i.e. less than about 0.2%. However, the amount of sulfur and phosphorous may vary substantially—e.g., between cupola melted gray iron and electric melted gray iron. It is presently preferred that sulfur be present in an amount less than about 0.17% and phosphorous in an amount less than about 0.12%.

It is preferred to avoid chromium in greater than residual amounts—i.e. less than about 0.2% by weight. Chromium is known to promote the formation of carbide and to reduce the formation of graphite. Thus, the presence of chromium adversely affects the machineability and thermal conductivity of the resulting gray iron alloy. Similarly, it is preferred to avoid the presence of magnesium in greater than trace amounts—i.e. less than about 0.005% and most preferably, less than about 0.001%. As described above, magnesium promotes the formation of nodular graphite, which severely reduces the thermal conductivity of the resulting gray alloy.

FIG. 1 is a photomicrograph of a casting of the inventive gray iron alloy containing copper and molybdenum. Free carbon is predominantly present in the form of flake graphite 10, which appears as irregularly shaped dark lines that are randomly oriented and dispersed throughout the gray iron matrix, as is typical of Type A flake graphite. The size of the graphite flakes is found to range from about 2 to 5, under ASTM specifications. Thus, the inventive gray iron alloy retains a Type A flake graphite microstructure similar to that of conventional gray iron.

The inventive gray iron was further tested for tensile strength and hardness. Tensile strength was determined by casting bars and testing in accordance with ASTM-A 48 specifications, as is well known in the art. The tensile strength of the inventive gray iron was determined to be approximately 50,000 psi. In contrast, conventional gray iron has a tensile strength of approximately 30,000 psi. Thus, the inventive gray iron alloy has a tensile strength that approaches that of ductile iron and is significantly better than the tensile strength of conventional gray iron.

In addition, the ratio of tensile strength to hardness of the inventive gray iron is substantially increased in comparison to conventional gray iron. The Brinell hardness of the inventive gray iron was determined using a 10 mm ball and 3000 kg load, as is well known in the art. The inventive gray iron was found to have a hardness of about 196–269 HB, which is substantially the same as conventional gray iron which has a hardness of about 187–269 HB Thus, the tensile strength of the inventive gray iron is significantly increased, without increasing hardness and reducing machineability in comparison to conventional gray iron.

Some variation in the tensile strength and hardness may occur as the composition of the inventive gray iron varies within the above ranges. However, it is expected that the inventive gray iron alloy maintains the Type A flake graphite microstructure and that the cooperative and complementary effects of combining molybdenum and copper are present throughout the range of composition described above.

The Examples below are illustrative of a preferred embodiment of the inventive gray iron alloy containing molybdenum and copper.

EXAMPLE 1

A gray iron alloy containing molybdenum and copper was prepared using conventional methods as described above, having the following chemical composition:

| Ingredient | Amount (% weight) |
| --- | --- |
| Carbon | 3.58 +/− 0.05 |
| Manganese | 0.60 +/− 0.10 |
| Silicon | 1.75 +/− 0.15 |
| Phosphorous | ≦0.12 |
| Sulfur | ≦0.17 |
| Molybdenum | 0.70 +/− 0.10 |
| Copper | 0.40 +/− 0.10 |
| Chromium | ≦0.20 |

Magnesium was present in an amount less than about 0.001%. Other elements and impurities commonly found in cast iron were present in residual amounts. The alloy was cast in the form of a brake drum with a lightweight design, such as the design of the Gunite-Lite (Gunite Corp.—Rockford, Ill.) lightweight brake drum.

The durability of the brake drum was tested using a standard inertia dynamometer and air braking system as is well known in the art, in accordance with following procedure. Prior to testing, the brake drum was burnished to ensure at least 80% contact between the braking surface and the brake shoe. Burnishing was accomplished by repeated snub deceleration of the brake drum, comprising accelerating the brake drum to an equivalent speed of 40 mph and then applying the brake to decelerate the brake drum to a speed of 20 mph. The line pressure of the air braking system during snub deceleration was sufficient to achieve a deceleration of 9–11 ft/sec$^2$. During the intervals between snub decelerations, the brake drum was run at a speed of 25–35 mph for a sufficient interval for the brake drum to reach a temperature of approximately 250° F., as measured prior to the start of acceleration to the braking speed of 40 mph. Snub deceleration was repeated a minimum of 200 times and continued until at least 80% contact between the braking surface and brake shoes was achieved.

The durability of the burnished brake drum was tested by performing a series of braking operations at increasing speed until the brake drum failed. The sequence of braking operations were performed as set forth below:

A. 1 stop from a speed of 50 mph at no more than 10 ft/sec$^2$, at an initial drum temperature of 125° F.

B. 1 stop from a speed of 60 mph at no more than 15 ft/sec$^2$, at an initial drum temperature of 125° F.

C. 1 stop from a speed of 70 mph at no more than 20 ft/sec$^2$, at an initial drum temperature of 125° F.

D. 50 stops from a speed of 30 mph at no more than 24 ft/sec$^2$, at an initial drum temperature of 200° F.

E. 50 stops from a speed of 50 mph at no more than 24 ft/sec$^2$, at an initial drum temperature of 200° F.

F. 100 stops from a speed of 60 mph at no more than 24 ft/sec$^2$, at an initial drum temperature of 200° F.

G. 200 stops from a speed of 70 mph at no more than 24 ft/sec$^2$, at an initial drum temperature of 200° F.

The braking operations were conducted at the stated deceleration rate, unless limited by a maximum line pressure of 100 psi. The brake drum was considered to have failed the durability test if drum failure occurred prior to completion of Step F above. Brake drum failure was defined as the presence of a crack progressing through the drum section or outside the bolt circle.

The results of the durability test are shown in Table 1, which compares brake drums made of the inventive gray iron alloy ("HT50") having a lightweight design, with samples of competitive, commercially available standard and lightweight brake drums (Samples A–F). Samples D and E are standard weight brake drums having conventional designs. Brake drum samples HT50, A, B, C, F and G are considered to have lightweight designs. In particular, Sample A is a compacted graphite iron brake drum having a lightweight design identical to that of the HT50 brake drum made of the inventive gray iron alloy.

TABLE 1

| Sample (weight lbs.) | Material | Avg. No. Stops at 70 mph (No. of Samples Tested) | Deceleration (ft/sec$^2$) at 60 mph |
| --- | --- | --- | --- |
| HT50 (90) | moly/copper gray iron | 97 (6) | 19.91 |
| A (90) | compacted graphite iron | 433 (3) | 16.11 |
| B (89) | compacted graphite iron | 232 (2) | 17.6 |
| C (100) | gray iron | 15 (2) Failed (1) | 18.75 |
| D (112) | gray iron | 150 (5) | 17.81 |
| E (114) | gray iron | 75 (3) | 18.98 |
| F (94) | steel/gray iron composite | 6 (2) Failed (1) | 18.84 |
| G (90) | steel/gray iron composite | 16 (2) Failed (2) | 19.19 |

Except where indicated as "Failed," all samples passed the durability test by completing 100 stops from a speed of 60 mph, as required by Step F. Table 1 shows only the number of stops completed in Step G prior to drum failure. For example, 4 brake drums of Sample C were tested, of which 1 drum failed prior to completion of Step F ("Failed") and 2 drums completed an average of 15 stops from a speed of 70 mph in Step G before failing.

As indicated in Table 1, all six test samples of the lightweight brake drums made of the inventive gray iron containing molybdenum and copper (HT50) passed the durability test by completing 100 stops from a speed of 60 mph (Step F) without drum failure. Furthermore, brake drums made of the inventive gray iron alloy completed an average of 97 stops from a speed of 70 mph, which is similar to the performance of conventional gray iron brake drums (Samples D and E) and is more durable than composite steel/gray iron lightweight brake drums (Samples F and G).

In addition, the average rate of deceleration of the sample brake drums was determined during Step F, by recording the amount of time required to stop the brake drum from a speed of 60 mph at a line pressure of 100 psi. The rate of deceleration (ft/sec$^2$) was calculated by dividing the initial speed of the brake drum (60 mph) by the time required to stop the brake drum.

Surprisingly, brake drums made of the inventive gray iron alloy were found to have a rate of deceleration of 19.91 ft/sec$^2$ from a speed of 60 mph, which was greater than the deceleration rate of any other conventional or lightweight brake drum tested. Thus, brake drums made of the inventive gray iron alloy provide a superior stopping ability in comparison to competitive brake drums made of standard gray iron, compacted graphite iron or steel/gray iron composites. It is believed that the presence of molybdenum and copper increases the relative stiffness of the inventive gray iron while maintaining the surface characteristics of conventional gray iron, which results in enhanced braking performance.

EXAMPLE 2

Brake drums made of the inventive gray iron alloy containing molybdenum and copper were produced as described in Example 1, and were tested under simulated speed maintenance braking conditions at various downhill grades using an inertia dynamometer and air braking system as is well known in the art. As used herein, the term "speed maintenance braking" refers to braking operations where grade dependent brake pressure is applied to the brake to control the speed of a vehicle without stopping, such as may be required by travel over downhill grades.

Prior to testing, the brake drums were burnished to ensure at least 80% contact between the braking surface and the brake shoe, as described in Example 1. The brake drums were then subjected to a repeated sequence or cycle of speed maintenance braking applications at various simulated downhill grades until drum failure occurred as defined in Example 1. Each cycle of braking applications was performed as set forth below:

A. 3 speed maintenance brake applications under a 4% grade at a brake torque of 5.5 Klb/in, each brake application for a period of 35 seconds followed by a cooling interval of 35 seconds.

B. 5 speed maintenance brake applications under a 6% grade at a brake torque of 7.3 Klb/in, each brake application for a period of 35 seconds followed by a cooling interval of 40 seconds.

C. 2 speed maintenance brake applications under a 3% grade at a brake torque of 3.8 Klb/in, each brake application for a period of 35 seconds followed by a cooling interval of 35 seconds.

D. 1 speed maintenance brake application under a 3% grade at a brake torque of 5.9 Klb/in, for a period of 40 seconds.

The initial temperature of the brake drum at the start of the each cycle was 115° F. A speed of 55 mph was maintained throughout each cycle. After completion of Step D, the brake drum was run at a speed of 5 mph until it cooled to a temperature of 115° F. and the sequence was repeated until drum failure occurred or 300 cycles were completed, whichever occurred first. The results of the speed maintenance braking test are shown in Table 2, which compares brake drums made of the inventive gray iron alloy (HT50) having a lightweight design, with competitive, commercially available standard and lightweight brake drums as described in Example 1.

TABLE 2

| Sample (weight lbs.) | Material | Avg. No. Cycles Completed (No. of Samples Tested) |
|---|---|---|
| HT50 (90) | moly/copper gray iron | 300 (2) |
| A (90) | compacted graphite iron | 155 (1) |
| B (89) | compacted graphite iron | 91 (3) |
| C (100) | gray iron | 300 (1) |
| D (112) | gray iron | 300 (2) |
| F (94) | steel/gray iron composite | 300 (4) |
| G (90) | steel/gray iron composite | 300 (1) |

As shown in Table 2, both test samples of the lightweight brake drums made of the inventive gray iron containing molybdenum and copper (HT50) passed the speed maintenance braking test by completing 300 cycles without drum failure. Thus, brake drums made of the inventive gray iron alloy performed as well under speed maintenance braking conditions as conventional gray iron brake drums (Samples C and D) and lightweight steel/gray iron composite brake drums (Samples F and G), and performed significantly better than lightweight compacted graphite iron brake drums (Samples A and B) which were unable to complete the speed maintenance braking test.

EXAMPLE 3

Brake drums made of the inventive gray iron alloy containing molybdenum and copper were produced as described in Example 1, and were tested for resistance to heat checking under drag/static braking conditions using an inertia dynamometer and air braking system as is well known in the art. In contrast to the speed maintenance braking test of Example 2, the drag/static braking operations in the heat check test were designed to subject the brake drum to braking conditions which result in a repeated high-low temperature thermal cycling. As used herein, the term "heat check" refers to hairline cracks that develop in the braking surface parallel to the axis of the brake drum, resulting from thermal cycling stress as described above.

Prior to testing, the brake drums were burnished to ensure at least 80% contact between the braking surface and the brake shoe, as described in Example 1. The brake drums were then subjected to a repeated series of drag/static braking operations until the drum failed. The drag/static braking operations were performed as set forth below:

A. 3 drag brake applications at a speed of 70 mph and brake torque of 1.0 Klb/in, each brake application performed for a period of 60 seconds with a cooling interval that lowers the drum temperature to the initial drum temperature of 150° F.

B. 1 static brake application at a gradual increase of line pressure to 100 psi and then held for 15 seconds. The drum is then brought to zero speed by means of the dynamometer motor braking and not through brake application.

The initial temperature of the brake drum prior to the drag brake applications (Step A) was 150° F. Following the drag braking step, a speed of 70 mph was maintained until the drum cooled to a temperature of 150° F., and then static braking was applied (Step B). The test was performed under a blower at a speed of 15 mph to simulate the wind from actual driving conditions. The cycle of drag/static braking applications was repeated until the drum failed, as defined by the appearance of a 1-inch crack through the outer wall of the drum. The results of the drag/static braking test are shown in Table 3, which compares brake drums made of the inventive gray iron alloy (HT50) having a lightweight design, with competitive, commercially available standard and lightweight brake drums as indicated in Example 1.

TABLE 3

| Sample (weight lbs.) | Material | Avg. No. Cycles Completed (No. of Samples Tested) |
|---|---|---|
| HT50 (90) | moly/copper gray iron | 169 (4) |
| A (90) | compacted graphite iron | 99 (3) |
| B (89) | compacted graphite iron | 105 (2) |
| C (100) | gray iron | 205 (3) |
| D (112) | gray iron | 360 (11) |
| F (94) | steel/gray iron composite | 304 (4) |
| G (90) | steel/gray iron composite | 443 (3) |

As shown in Table 3, lightweight brake drums made of the inventive gray iron containing molybdenum and copper (HT50) significantly outperformed lightweight compacted graphite iron brake drums (Samples A and B) in the heat check test. In contrast, the inventive gray iron brake drums do not appear to performed as well in comparison to brake drums having conventional gray iron braking surfaces (Samples C, D, F and G). However, the results of the heat check test must take into account the relative weight of the sample brake drums. The conventional gray iron brake drums, Samples C and D, are standard weight brake drums that have greater thermal mass for absorbing the heat generated by braking in comparison to the lightweight brake drum, HT50. Thus, the comparative performance of Samples C, D and HT50 reflects their weights, with the heaviest brake drum (Sample D, 112 lbs.) completing the greatest number of cycles in the heat check test and the lightest brake drum (HT50, 90 lbs.) completing the fewest number of cycles. When the relative thermal mass of the sample brake drums is taken into account, it is believed that the inventive gray iron alloy brake drums perform at least as well as brake drums made of conventional gray iron.

EXAMPLE 4

If brake drums were made of a gray iron alloy in accordance with the present invention and tested as described in Examples 1–3, having the compositions set forth in alternative embodiments A and B below, such brake drums would be found to have comparable performance to that found for the HT50 brake drum in Examples 1–3.

| | Amount (% weight) | |
|---|---|---|
| Ingredient | Alternative A | Alternative B |
| Carbon | 3.5 | 3.65 |
| Manganese | 0.4 | 0.9 |

-continued

| Ingredient | Amount (% weight) | |
|---|---|---|
| | Alternative A | Alternative B |
| Silicon | 1.9 | 1.5 |
| Phosphorous | ≦0.12 | ≦0.12 |
| Sulfur | ≦0.17 | ≦0.17 |
| Molybdenum | 0.6 | 0.8 |
| Copper | 0.3 | 0.6 |
| Chromium | ≦0.20 | ≦0.20 |

Although the Examples set forth above refer to brake drums, those of skill in the art will readily appreciate that the advantages of the inventive gray iron alloy described herein—e.g., increased tensile strength while maintaining the thermal conductivity and machineability of conventional gray iron—have a broad range of applications. Accordingly, the inventive gray iron may be used in the manufacture of brake rotors and other articles that must be machined and that are subject to thermal stress and shock during use.

It will be apparent to those of skill in the art that modifications may be made without departing from the spirit and scope of the invention. Accordingly, it is not intended that the invention be limited except in view of the appended claims.

What is claimed is:

1. A high tensile strength gray iron alloy, consisting essentially of, as a percentage by weight:
    about 4.10% to about 4.25% carbon equivalent;
    about 3.5% to about 3.65% carbon;
    about 0.4% to about 0.9% manganese;
    about 1.5% to about 1.9% silicon;
    less than about 0.12% phosphorous;
    less than about 0.17% sulfur;
    about 0.6% to about 0.8% molybdenum; and
    about 0.3% to about 0.6% copper;
    with the balance being essentially iron, and said carbon being predominantly present in said metal alloy as free carbon.

2. The gray iron alloy of claim 1, wherein said free carbon is predominantly Type A flake graphite.

3. The gray iron alloy of claim 1, wherein said amount of carbon is about 3.60%.

4. The gray iron alloy of claim 1, wherein said amount of manganese is about 0.60%.

5. The gray iron alloy of claim 1, wherein said amount of silicon is about 1.75%.

6. The gray iron alloy of claim 1, wherein said amount of molybdenum is about 0.70%.

7. The gray iron alloy of claim 1, wherein said amount of copper is about 0.40%.

8. The gray iron alloy of claim 1, further comprising chromium in an amount less than about 0.2%.

9. The gray iron alloy of claim 1, further comprising magnesium in an amount less than about 0.005%.

10. The gray iron alloy of claim 9, wherein said amount of magnesium is less than about 0.001%.

11. A high tensile strength gray iron alloy, consisting essentially of, by percentage weight:
    about 4.10% to about 4.25% carbon equivalent
    about 3.5% to about 3.65% carbon;
    about 0.4% to about 0.9% manganese;
    about 1.5% to about 1.9% silicon;
    about 0.6% to about 0.8% molybdenum; and
    about 0.3% to about 0.6% copper;
    with the balance being essentially all iron except for incidental elements and impurities commonly found in cast iron, and said carbon being predominantly present in said gray iron alloy as free carbon.

12. The gray iron alloy of claim 11, wherein said free carbon is predominantly Type A flake graphite.

13. The gray iron alloy of claim 11, further comprising phosphorous in an amount less than about 0.12%.

14. The gray iron alloy of claim 11, further comprising sulfur in an amount less than about 0.17%.

15. The gray iron alloy of claim 11, wherein chromium is present in an amount less than about 0.2%.

16. The gray iron alloy of claim 11, further comprising magnesium in an amount less than about 0.005%.

17. The gray iron alloy of claim 16, wherein said amount of magnesium is less than about 0.001%.

18. A high tensile strength gray iron alloy, consisting essentially of, as a percentage by weight:
    about 4.10% to about 4.25% carbon equivalent
    about 3.5% to about 3.65% carbon;
    about 0.4% to about 0.9% manganese;
    about 1.5% to about 1.9% silicon;
    less than about 0.12% phosphorous;
    less than about 0.17% sulfur;
    about 0.6% to about 0.8% molybdenum; and
    about 0.3% to about 0.6% copper;
    with the balance being essentially iron, and said carbon being predominantly present in said metal alloy as Type A flake graphite.

19. A high tensile strength gray iron alloy, consisting essentially of, as a percentage by weight:
    about 3.60% carbon;
    about 0.60% manganese;
    about 1.75% silicon;
    less than about 0.12% phosphorous;
    less than about 0.17% sulfur;
    about 0.7% molybdenum; and
    about 0.40% copper;
    with the balance being essentially iron, and said carbon being predominantly present in said metal alloy as Type A flake graphite.

20. A high tensile strength gray iron casting having a composition consisting essentially of, as a percentage by weight:
    about 4.10% to about 4.25% carbon equivalent
    about 3.5% to about 3.65% carbon;
    about 0.4% to 0.9% about manganese;
    about 1.5% to about 1.9% silicon;
    about 0.6% to about 0.8% molybdenum; and
    about 0.3% to about 0.6% copper;
    with the balance being essentially all iron except for incidental elements and impurities commonly found in cast iron, and said carbon being predominantly present in said gray iron as free carbon.

21. The gray iron casting of claim 20, wherein said free carbon is predominantly Type A flake graphite.

22. The gray iron casting of claim 20, wherein said amount of carbon is about 3.60%.

23. The gray iron casting of claim 20, wherein said amount of manganese is about 0.60%.

24. The gray iron casting of claim 20, wherein said amount of silicon is about 1.75%.

25. The gray iron casting of claim 20, wherein said amount of molybdenum is about 0.70%.

26. The gray iron casting of claim 20, wherein said amount of copper is about 0.40%.

27. The gray iron casting of claim 20, further comprising phosphorous in an amount less than about 0.12%.

28. The gray iron casting of claim 20, further comprising sulfur in an amount less than about 0.17%.

29. The gray iron casting of claim 20, further comprising chromium in an amount less than about 0.2%.

30. The gray iron casting of claim 20, further comprising magnesium in an amount less than about 0.005%.

31. The gray iron casting of claim 30, wherein said amount of magnesium is less than about 0.001%.

32. The gray iron casting of claim 20, wherein said casting is in the form of a brake drum.

33. The gray iron casting of claim 20, wherein said casting is in the form of a brake rotor.

34. A high tensile strength cast gray iron brake drum, said gray iron consisting essentially of, as a percentage by weight:
   about 3.60% carbon;
   about 0.60% manganese;
   about 1.75% silicon;
   less than about 0.12% phosphorous;
   less than about 0.17% sulfur;
   about 0.7% molybdenum; and
   about 0.40% copper;
with the balance being essentially iron except for incidental elements and impurities commonly found in cast iron, and said carbon being predominantly present in said gray iron as Type A flake graphite.

35. The cast gray iron brake drum of claim 34, further comprising chromium in an amount less than about 0.2%.

36. The cast gray iron brake drum of claim 34, further comprising magnesium in an amount less than about 0.005%.

37. The cast gray iron brake drum of claim 36, wherein said amount of magnesium is less than about 0.001%.

\* \* \* \* \*